US010145396B2

(12) United States Patent
Du et al.

(10) Patent No.: US 10,145,396 B2
(45) Date of Patent: Dec. 4, 2018

(54) ENERGY RECOVERY SYSTEM AND METHOD FOR HYDRAULIC TOOL

(71) Applicant: Caterpillar Inc., Peoria, IL (US)

(72) Inventors: Hongliu Du, Naperville, IL (US); Joseph R. Robey, Shorewood, IL (US)

(73) Assignee: Caterpillar Inc., Deerfield, IL (US)

( * ) Notice: Subject to any disclaimer, the term of this patent is extended or adjusted under 35 U.S.C. 154(b) by 167 days.

(21) Appl. No.: 15/380,708

(22) Filed: Dec. 15, 2016

(65) Prior Publication Data

US 2018/0172039 A1 Jun. 21, 2018

(51) Int. Cl.

*F16D 31/02* (2006.01)
*F15B 21/14* (2006.01)
*F15B 13/04* (2006.01)
*E02F 9/22* (2006.01)
*E02F 3/43* (2006.01)

(52) U.S. Cl.

CPC ............ *F15B 21/14* (2013.01); *E02F 9/2217* (2013.01); *E02F 9/2267* (2013.01); *E02F 9/2271* (2013.01); *E02F 9/2296* (2013.01); *F15B 13/0401* (2013.01); *E02F 3/431* (2013.01); *F15B 2013/0412* (2013.01); *F15B 2211/20546* (2013.01); *F15B 2211/20553* (2013.01); *F15B 2211/625* (2013.01); *F15B 2211/88* (2013.01)

(58) Field of Classification Search

CPC .......... F15B 1/024; F15B 21/14; F04B 1/324; F04B 49/002
USPC ...................................... 60/414; 91/505, 506
See application file for complete search history.

(56) References Cited

U.S. PATENT DOCUMENTS 3,153,899 A * 10/1964 Budzich .................. F04B 49/00 417/222.1
3,339,660 A * 9/1967 Budzich ................. B60K 17/10 91/506
7,082,757 B2 * 8/2006 Teslak ..................... F04B 49/03 60/414
7,297,064 B2 11/2007 Jackel et al.
7,367,258 B2 * 5/2008 Wanschura ............. F04B 1/324 91/506

(Continued)

FOREIGN PATENT DOCUMENTS

WO WO 2010/122951 A1 10/2010

*Primary Examiner* — Michael Leslie
(74) *Attorney, Agent, or Firm* — Oblon, McClelland, Maier & Neustadt

(57) ABSTRACT

An energy recovery system includes cylinders that articulate a hydraulic tool in a pump mode to provide potential energy and in a motor mode to recover the potential energy. The energy recovery system includes a tank that stores a hydraulic fluid for the cylinders and an open circuit variable displacement pump that circulates the hydraulic fluid in the pump mode from the tank to the cylinders and in the motor mode from the cylinders to the tank. The open circuit variable displacement pump includes a swashplate articulable between a positive position and a negative position. In the positive position, the hydraulic fluid circulates in the pump mode and in the negative position the hydraulic fluid circulates in the motor mode. The open circuit variable displacement pump includes an actuator that articulates the swashplate and a bias system that maintains the swashplate in a positive position when the hydraulic fluid is not in circulation.

20 Claims, 10 Drawing Sheets

(56) References Cited

U.S. PATENT DOCUMENTS

| | | | | |
|---|---|---|---|---|
| 7,451,685 | B2 * | 11/2008 | Tabor | F15B 21/14<br>91/361 |
| 8,596,057 | B2 | 12/2013 | Du | |
| 8,661,804 | B2 | 3/2014 | Wagner | |
| 8,683,793 | B2 * | 4/2014 | Bergstrom | F15B 21/14<br>60/414 |
| 8,887,499 | B2 | 11/2014 | Edler et al. | |
| 9,963,855 | B2 * | 5/2018 | Jagoda | F15B 1/024 |
| 10,012,219 | B2 * | 7/2018 | Bracht | F04B 1/324 |

* cited by examiner

ENERGY RECOVERY SYSTEM AND METHOD FOR HYDRAULIC TOOL

TECHNICAL FIELD

The present disclosure relates to hydraulic tools, and more particularly to an energy recovery system for a hydraulic tool and a method for operating the energy recovery system.

BACKGROUND

A conventional hydraulic tool, such as a wheel loader, an excavator, and a shovel, typically includes a variable displacement pump powered by an engine to push a hydraulic fluid in and out from hydraulic cylinders, so as to articulate the hydraulic tool. Such articulation of the hydraulic tool performs desired tasks, e.g., raising and/or lowering materials contained in a bucket. When the hydraulic tool is articulated a potential energy can be generated, e.g., when the materials are raised. In the conventional hydraulic tool, this potential energy is often wasted and not recovered when the hydraulic cylinders can be articulated through the potential energy, e.g., when the materials are lowered. In addition, when the hydraulic cylinders are articulated through the potential energy, the hydraulic fluid can dissipate the potential energy in form of heat and can overheat some circuit elements crossed by the hydraulic fluid, e.g., valves and/or filters.

Further, the conventional hydraulic tool may include a hydraulic circuit that requires a complex control system. This complex control system is often hydro-mechanically designed or uses linear control methods, such that the stability is essentially localized within a certain range around an operating point. To ensure the controllability of control systems with a wide range of operation, small feedback gains have to be used. Particularly, it is desired that a bandwidth of a closed loop pump control system should be sufficiently high and robust. It is very difficult to reasonably satisfy such two contradictory requirements simultaneously using a hydro-mechanical or other outer loop linear control design.

U.S. Pat. No. 8,887,499 (hereinafter the '499 patent) describes a method for overpressure control in a hydraulic system having multiple hydraulic pumps, with each hydraulic pump being connected by a respective hydraulic circuit for actuating a single respective cylinder. The method includes actuating a first variable displacement hydraulic pump which is fluidly linked by a first hydraulic circuit to a first cylinder for powering the first cylinder. According to the '499 patent, upon detecting a pressure that exceeds a predetermined threshold pressure, the flow rate of the first hydraulic pump is electronically modified to a second flow rate lower than the first flow rate. As a result, the pressure in the first hydraulic circuit is reduced to a pressure that is below the predetermined threshold pressure.

SUMMARY

In one aspect of the present disclosure, an energy recovery system for a hydraulic tool is provided. The energy recovery system includes a control interface configured to receive inputs corresponding to a prescribed motion for the hydraulic tool. The energy recovery system also includes a hydraulic system configured to articulate the hydraulic tool based on the prescribed motion in a pump mode to provide potential energy, and in a motor mode to recover energy from the potential energy. The hydraulic circuit includes cylinders configured to receive and release a hydraulic fluid. The hydraulic circuit also includes a tank configured to store the hydraulic fluid. The hydraulic circuit further includes an open circuit variable displacement pump configured to circulate the hydraulic fluid from the tank to the cylinders in the pump mode and circulate the hydraulic fluid from the cylinders to the tank in the motor mode. The open circuit variable displacement pump includes a swashplate articulable between a positive position and a negative position. In the positive position, the hydraulic fluid circulates in the pump mode; and in the negative position, the hydraulic fluid circulates in the motor mode. The open circuit variable displacement pump also includes an actuator configured to articulate the swashplate, and a bias system configured to maintain the swashplate in a positive position when the hydraulic fluid is not in circulation. The energy recovery system further includes an engine configured to provide energy to the open circuit variable displacement pump in the pump mode and receive energy from the open circuit variable displacement pump in the motor mode.

In another aspect of the present disclosure, an energy recovery system for a hydraulic tool is provided. The energy recovery system includes cylinders configured to articulate the hydraulic tool in a pump mode to provide potential energy and in a motor mode to recover the potential energy. The energy recovery system also includes a tank configured to store a hydraulic fluid for the cylinders. The energy recovery system further includes an open circuit variable displacement pump configured to circulate the hydraulic fluid in the pump mode from the tank to the cylinders and in the motor mode from the cylinders to the tank. The open circuit variable displacement pump includes a swashplate articulable between a positive position and a negative position. In the positive position, the hydraulic fluid circulates in the pump mode; and in the negative position, the hydraulic fluid circulates in the motor mode. The open circuit variable displacement pump includes an actuator configured to articulate the swashplate. The open circuit variable displacement pump also includes a bias system configured to maintain the swashplate in a positive position when the hydraulic fluid is not in circulation.

In yet another aspect of the present disclosure, a method of operating an energy recovery system for a hydraulic tool is provided. The method includes providing an open circuit variable displacement pump with a swashplate. The method also includes providing a swashplate actuator to articulate the swashplate, the swashplate actuator having a three-way valve actuated by a solenoid. The method includes receiving, at a controller, signals corresponding to operator commands to control the hydraulic tool. The method includes calculating, using the controller, a desired angle displacement for the swashplate based on the operator commands, an upper torque limit, and a lower torque limit. The method includes calculating, using the controller, a desired valve position for the three-way valve based on the desired angle displacement. The method includes generating electrical current for the solenoid based on the desired valve position. The method further includes displacing the swashplate, via the swashplate actuator, based on the generated electrical current.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, corresponding or similar reference numbers will be used throughout the drawings to refer to the same or corresponding parts.

Any reference in the specification to “one embodiment” or “an embodiment” means that a particular feature, structure, characteristic, operation, or function described in connection with an embodiment is included in at least one embodiment. Thus, any appearance of the phrases “in one embodiment” or “in an embodiment” in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

Generally speaking, embodiments of the present subject matter provide an energy recovery system and a method of operating the energy recovery system, involving an open circuit variable displacement pump with a swashplate actuated, via a swashplate actuator, to recover energy from the potential energy and transfer the recovered energy to an engine and/or a tank of the hydraulic tool. The open circuit variable displacement pump can be actuated in a pump mode to receive energy from the engine, and in a motor mode to harvest the potential energy from the cylinders and to transfer a recovered energy to the engine and/or the tank.

Figure 1A:
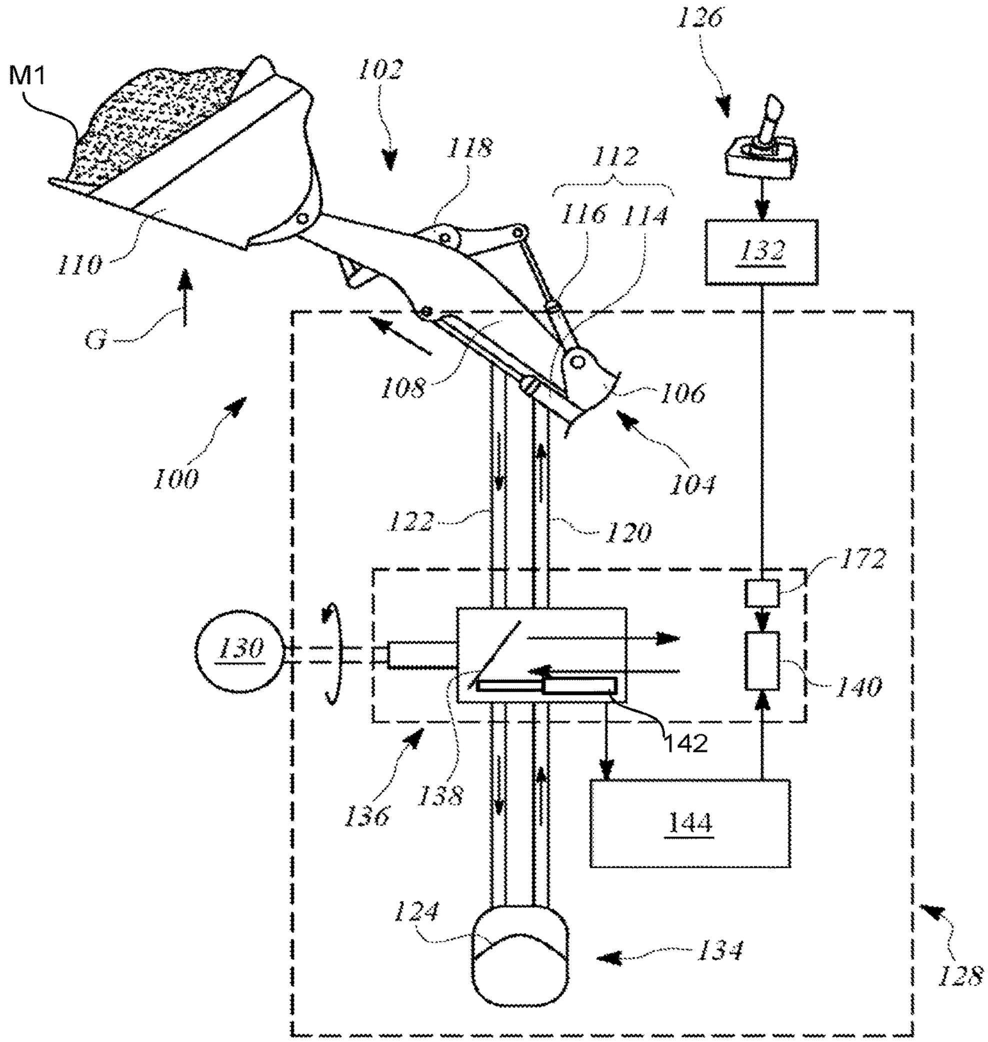
FIG. 1A is a schematic view of an energy recovery system for a hydraulic tool in a pump mode, according to one or more embodiments of the present disclosure.
Figure 1B:
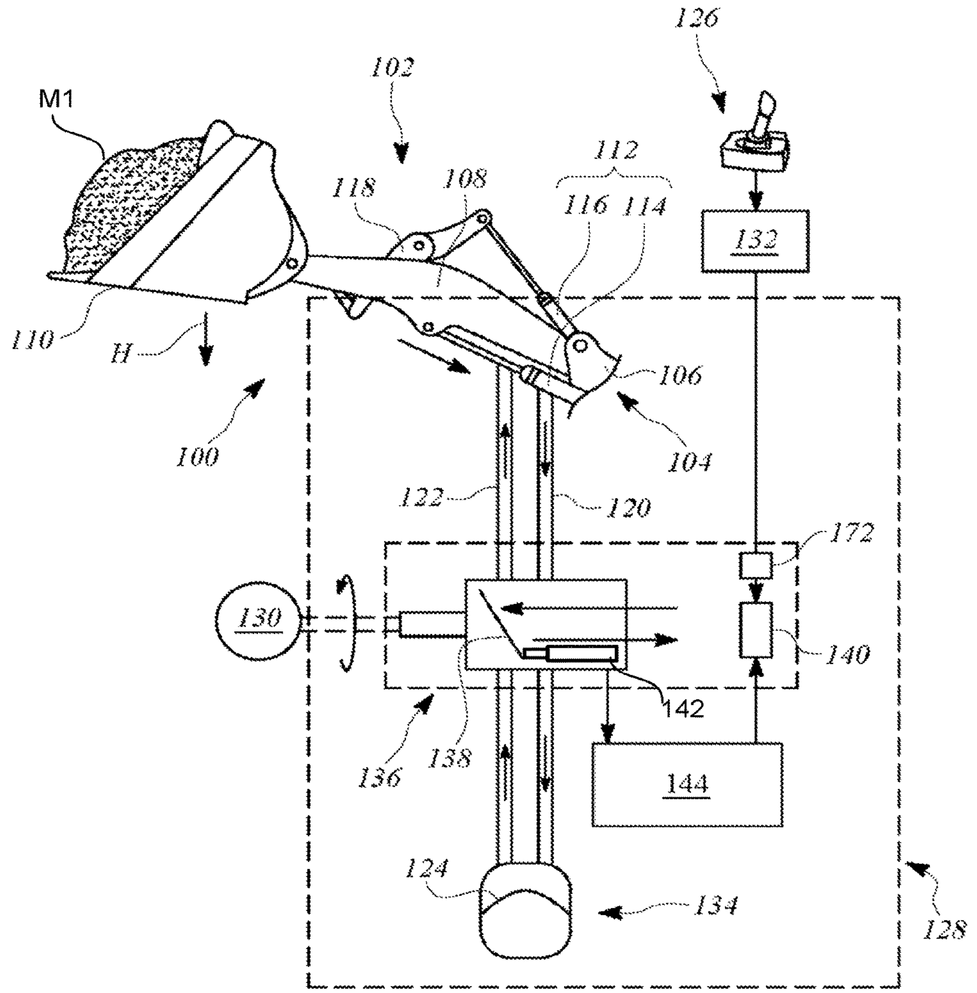
FIG. 1B is schematic view of an energy recovery system for a hydraulic tool in a motor mode, according to one or more embodiments of the present disclosure

FIGS. 1A-1B illustrate schematic views of an energy recovery system 100 for a hydraulic tool 102, according to one or more embodiments of the present disclosure. The hydraulic tool 102 may be a fixed or mobile machine that performs some type of operation associated with industries, such as mining, construction, agriculture or any other industry. For example, the hydraulic tool 102 may be an earth-moving machine such as a wheel loader, an excavator, a shovel, a backhoe, a dump truck, or any other earth-moving machine. In one embodiment of FIGS. 1A-1B, the hydraulic tool 102 may be an excavator of which a front end portion is shown.

Referring again to FIGS. 1A-1B, the hydraulic tool 102 may include a work implement system 104 having a work implement 110 configured to perform various operations, such as digging, leveling, etc. To perform such operations, the work implement 110 performs prescribed motions, for example to lift and/or raise material M1 contained in the work implement 110 during various operations. In the illustrated embodiment, prescribed motion of the work implement system 104 of the hydraulic tool 102 refers to pivotal movement of the work implement 110 in a substantially horizontal direction and in a substantially vertical direction.

In FIG. 1A, the work implement system 104 is shown to pivotally move the work implement 110 upwards in a first vertical direction ‘G’ to lift the material M1, also referred to as the “lifting motion.” In FIG. 1B, the work implement system 104 is shown to pivotally move the work implement 110 in a second vertical direction ‘H’ opposite to the first vertical direction ‘G’ to lower the material M1, also referred to as the “lowering motion.” Although in FIGS. 1A-1B, the work implement 110 is shown as a bucket, in other embodiments the work implement 110 may be a ripper, a drill, a scraping tool, etc.

The work implement system 104 may include a number of components, including, for example, a boom 106 pivotally attached to a frame of the hydraulic tool 102 and a support arm 108 pivotally attached to the boom 106 and the work implement 110. To effectuate the pivotal movements of the work implement 110, the work implement system 104 may also include a plurality of cylinders 112 attached between each of the components of the work implement system 104. In one embodiment, the plurality of cylinders 112 can include a first cylinder 114 connected between the frame and the boom 106 to move the boom 106. The plurality of cylinders 112 may also include a second cylinder 116 connected between the support arm 108 and the work implement 110, through arm linkages 118, to effectuate pivotal movement of the work implement 110 with respect to the support arm 108.

In the illustrated embodiment, each of the plurality of cylinders 112 provide pivotal movement between pivotally connected components, such as the boom 106, the arm linkages 118, the support arm 108 and the work implement

110, based on a rate and a direction of fluid flow to and from the plurality of cylinders 112. In particular, for the lifting motion of the work implement 110, the plurality of cylinders 112, as shown in FIG. 1A, can be configured to receive the hydraulic fluid through a first fluid line 120 and release the hydraulic fluid through a second fluid line 122. Specifically, during the lifting motion of the work implement 110, the plurality of cylinders 112 is extended due to a pressurized flow of hydraulic fluid into the cylinders 112 through the first fluid line 120.

Conversely, for the lowering motion of the work implement 110, the cylinders 112, as shown in FIG. 1B, are configured to release the hydraulic fluid through the first fluid line 120 and receive the hydraulic fluid through the second fluid line 122. Specifically, during the lowering motion of the work implement 110, the cylinders 112 may be retracted by gravity acting on the work implement system 104 and that may be amplified by a weigh of the material M1 carried by the work implement 110. This retraction may force the pressurized hydraulic fluid out of the cylinders 112 through the first fluid line 120.

Consequently, during the lifting motion a potential energy may be generated and during the lowering motion, this potential energy may be released. The energy recovery system 100 is associated with the hydraulic tool 102 to harvest the potential energy released during the lowering motion of the work implement 110. Specifically, the energy recovery system 100 may recover energy associated with the pressurized hydraulic fluid discharged from the cylinders 112, during the lowering motion of the work implement 110.

Referring again to FIGS. 1A-1B, the energy recovery system 100 can include a control interface 126 configured to receive inputs corresponding to a prescribed motion for the hydraulic tool 102, a hydraulic circuit 128 to articulate the hydraulic tool 102 based on the prescribed motion, and an engine 130 to provide power required for articulation of the hydraulic tool 102.

In one embodiment, as shown, the control interface 126 may be a joystick. Alternatively, the control interface 126 may include any other input unit such as, a control lever, a push button, or a steering wheel to assist the operator for providing inputs to the hydraulic tool 102, and thereby operating the hydraulic tool 102. Specifically, the control interface 126 may receive inputs from the operator to control the movement of the hydraulic tool 102, for example movement of the work implement system 104. In other words, the control interface 126 may receive the operator command from the operator to perform prescribed motion in an operation, using the work implement system 104 through the plurality of cylinders 112. The term prescribed motion herein refers to a specific movement of the work implement system 104 that is to be performed in the operation. For example, during the digging operation, the prescribed motion may be a repetition of the lifting and the lowering motions of the work implement 110.

As shown in FIGS. 1A-1B, the control interface 126 may be in communication with a controller 132. The controller 132 can be configured to receive inputs corresponding to the prescribed motion for the hydraulic tool 102, and the control interface 126 may be configured to communicate the signals corresponding to the prescribed motion to the controller 132. Based on signals received from the control interface 126, the controller 132 may identify a type of operation of the work implement 110 and a type of motion an operator desires to perform on the work implement system 104. Based on the operation and the type of motion, the controller 132 may control the hydraulic circuit 128 to articulate the hydraulic tool 102 for performing the prescribed motion.

In one embodiment, if the controller 132 identifies the prescribed motion for the hydraulic tool 102 as the lifting motion of the work implement 110, the controller 132 may control the hydraulic circuit 128 to supply the hydraulic fluid from the cylinders 112 through the first fluid line 120 and release the hydraulic fluid from the cylinders 112 through the second fluid line 122. In another embodiment, if the controller 132 identifies the prescribed motion for the hydraulic tool 102 as the lowering motion of the work implement 110, the controller 132 may control the hydraulic circuit 128 to release the hydraulic fluid from the cylinders 112 through the first fluid line 120 and supply the hydraulic fluid to the cylinders 112 through the second fluid line 122. Details pertaining to operational and constructional features of the controller 132 will be described in detail with reference to FIGS. 7-8.

Further, the hydraulic circuit 128 may be configured to articulate the hydraulic tool 102 based on the prescribed motion in a pump mode to provide the potential energy and implement the lifting motion of the work implement 112, and in a motor mode to recover energy from the potential energy and implement the lowering motion of the work implement 112. The hydraulic circuit 128 may include the plurality of cylinders 112 that receives and releases the hydraulic fluid, and a tank 134 that stores the hydraulic fluid. In one embodiment, the tank 134 may include an accumulator 124 to maintain the hydraulic fluid under pressure and store energy recovered in the motor mode.

The hydraulic circuit 128 may further include a variable displacement pump, for instance, an open circuit variable displacement pump 136, that circulates the hydraulic fluid between the tank 134 and the cylinders 112 based on control of the controller 132. Specifically, the open circuit variable displacement pump 136 of the hydraulic circuit 128 may be configured to circulate the hydraulic fluid from the tank 134 to the cylinders 112 through the first fluid line 120 in the pump mode. Further, in the motor mode, the open circuit variable displacement pump 136 may be configured to receive the hydraulic fluid from the cylinders 112, through the first fluid line 120, for supplying the hydraulic fluid to the tank 134.

Therefore, in the pump mode, the open circuit variable displacement pump 136 may circulate the hydraulic fluid from the tank 134 to the cylinders 112, through the first fluid line 120, to perform the lifting motion of the work implement 110, as illustrated in FIG. 1A. Further, in the motor mode, the open circuit variable displacement pump 136 may circulate the hydraulic fluid from the cylinders 112 to the tank 134, through the first fluid line 120, to perform the lowering motion of the work implement 110, as illustrated in FIG. 1B. The open circuit variable displacement pump 136 may include a swashplate 138, an actuator 140, and a bias system 142 (shown in FIG. 2), which will be described in detail with reference to FIGS. 2-5.

In one embodiment, a pressure of the hydraulic fluid through the open circuit variable displacement pump 136 may be limited within a pressure range. In this regard, to monitor a pressure of the hydraulic fluid in the open circuit variable displacement pump 136, a pressure sensor 144 may be in communication with the open circuit variable displacement pump 136. For example, the pressure sensor 144 may be located at an output port of the open circuit variable displacement pump 136 and may be adapted to sense an output pressure of the hydraulic fluid from the open circuit variable displacement pump 136. It may be contemplated that the pressure sensor 144 may alternatively be provided at any other position suitable for sensing the pressure of the hydraulic fluid from the open circuit variable displacement pump 136, such as at a point along the first fluid line 120 and/or the second fluid line 122 from the open circuit variable displacement pump 136 to the tank 134.

As shown in FIGS. 1A-1B, the open circuit variable displacement pump 136 may be operably coupled to the engine 130. Due to such coupling with the engine 130, the open circuit variable displacement pump 136 may, in the pump mode, receive energy from the engine 130, and may, in the motor mode, provide recovered energy from the potential energy to the engine 130. In other words, the engine 130 may be configured to provide energy to the open circuit variable displacement pump 136 in the pump mode, so as to lift the material M1 contained in the work implement 110, and may be configured to receive recovered energy from the open circuit variable displacement pump 136 in the motor mode, for example when the material M1 contained in the work implement 110 is lowered. In some embodiments, the energy recovered in the motor mode may additionally be supplied to the tank 134 in form of pressurized hydraulic fluid.

Figure 2:
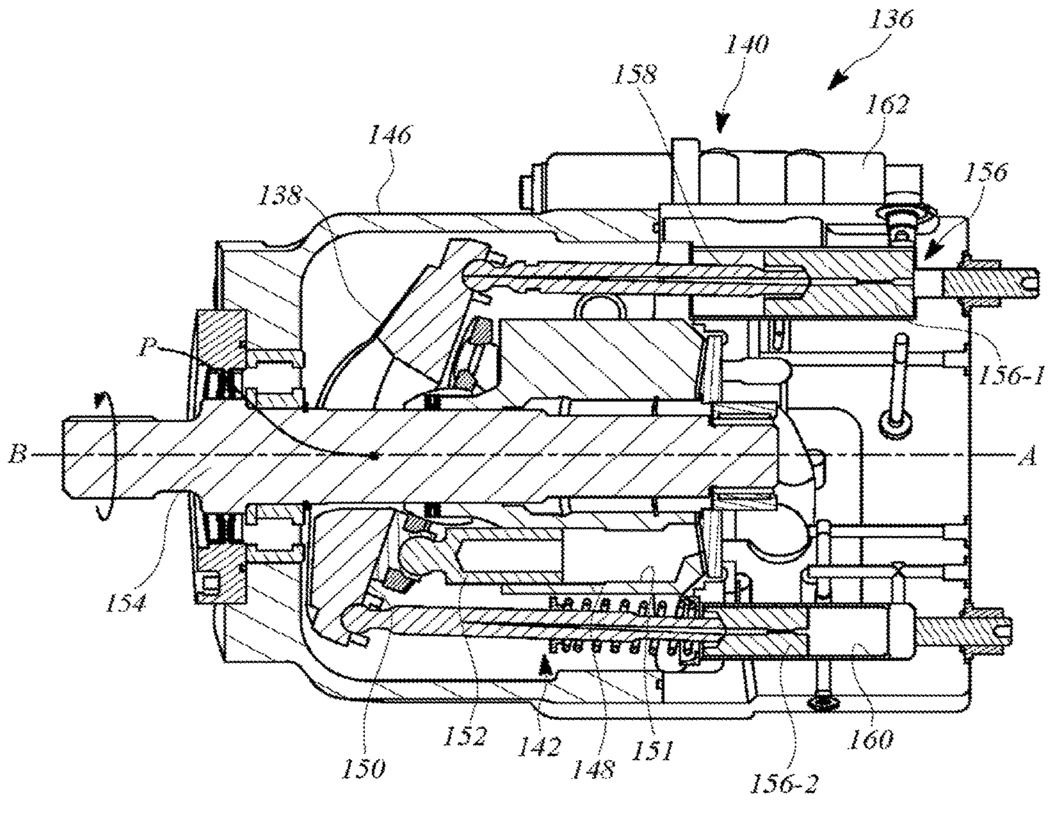
FIG. 2 is a sectional view of an open circuit variable displacement pump of the energy recovery system, according to one or more embodiments of the present disclosure.

FIG. 2 illustrates a sectional view of the variable displacement pump 136, which may be an open circuit variable displacement pump, according to one or more embodiments of the present disclosure. In one embodiment, the open circuit variable displacement pump 136, as shown, may be an over-center swashplate type hydraulic piston pump. The open circuit variable displacement pump 136 may also include a housing 146 and a barrel 148 disposed in the housing 146 to rotate about a barrel axis BA. The open circuit variable displacement pump 136 may also include the swashplate 138, which may have a driving surface 150, and the actuator 140 that articulates the swashplate 138.

The barrel 148 may define a series of chambers 151, one of which is shown in FIG. 2. The chambers 151 may be spaced in a circular array at regular intervals about the barrel axis BA. Each chamber of the series of chambers 151 may be configured to receive one piston 152, which may perform oscillatory motion within the respective chamber 151. In one embodiment, one end of each piston 152 may be biased against the driving surface 150 of the swashplate 138 such that each piston 152 performs oscillatory motion due to the rotation of the barrel 148 and an inclination of the swashplate 138 with respect to the housing 146. Specifically, when the barrel 148 is rotated, inclination of the swashplate 138 may cause the pistons 152 to undergo an oscillatory displacement in and out of the barrel 148 along the barrel axis BA. Due to such movement of the pistons 152, the hydraulic fluid may be drawn into the chambers 151 and pushed out of the chambers 151.

In one embodiment, to cause rotational motion of the barrel 148 within the housing 146, the open circuit variable displacement pump 136 may include a shaft 154. One end of the shaft 154 may be connected to the engine 130 (shown in FIGS. 1A and 1B), which may be configured to generate rotational mechanical output. Another end of the shaft 154 may be connected to the barrel 148 such that a rotation of the shaft 154 may cause a corresponding rotation of the barrel 148. Further, during operation of the hydraulic tool 102, rotational speed of the shaft 154 may be varied to control rotational speed of the barrel 148, based on operational requirements of the hydraulic tool 102, such as load of material M1 to be lifted. In some examples, the rotational speed of the shaft 154 may be varied based on the operating speed of the engine 130, to vary rotational speed of the barrel 148.

Furthermore, in some embodiments, to meet operational requirements of the hydraulic tool 102, amount of hydraulic fluid drawn into and out of the chambers 151 may also be controlled by varying stroke length of each piston 152, which may increase the amount of hydraulic fluid that is pressurized to the predetermined level during each rotation of the barrel 148. The stroke length of each piston 151 may be varied by changing the inclination of the swashplate 138 with respect to the housing 146. In one embodiment, the swashplate 138 may be articulable to any position defined between a positive position (shown in FIG. 3) and a negative position (shown in FIG. 4). In both the positive position and the negative position, inclination of the swashplate 138 may be varied. In the positive position, the hydraulic fluid may circulate in the pump mode; and in the negative position, the hydraulic fluid may circulate in the motor mode. Specifically, when the swashplate 138 is disposed in the positive position, the open circuit variable displacement pump 136 may be actuated to the pump mode to circulate the hydraulic fluid from the tank 134 to the cylinders 112 (see FIG. 1A). Conversely, when the swashplate 138 is disposed in the negative position, the open circuit variable displacement pump 136 may be actuated to the pump mode to circulate the hydraulic fluid from the cylinders 112 to the tank 134 (as shown in FIG. 1B).

In one embodiment, the actuator 140, of the open circuit variable displacement pump 136 may be configured to articulate the swashplate 138 between the positive position and the negative position. The actuator 140 may include a pair of actuating pistons 156, individually referred to as a first actuating piston 156-1 and a second actuating piston 156-2. The pair of actuating pistons 156 can be configured to move to rotate the swashplate 138 between the positive position and the negative position. In one embodiment, the first actuating piston 156-1 and the second actuating piston 156-2 may be received in a first chamber 158 and a second chamber 160, respectively. Both the first chamber 158 and the second chamber 160 may be formed opposite to each other within the housing 146.

Further, the first actuating piston 156-1 and the second actuating piston 156-2 may be configured to perform oscillatory motion within the first chamber 158 and the second chamber 160, respectively, based on pressurized fluid flow through the respective chambers 151. Owing to the oscillatory motion of the first actuating piston 156-1 and the second actuating piston 156-2, the pair of actuating pistons 156 may apply a force on the swashplate 138 so as to rotate the swashplate 138 with respect to a pivot, such as a pivot point 'P.' Specifically, the forces applied by the pair of actuating pistons 156 may create movements of the swashplate 138 so as to rotate the swashplate 138 between the positive position and the negative position about the pivot point 'P.'

Referring now to FIGS. 1A-1B, and 2, the actuator 140 may include a three-way valve 162 that actuates the first and second actuating pistons 156-1, 156-2 by controlling flow of pressurized fluid through the first chamber 158 and the second chamber 160. In one embodiment, the three-way valve 162 may be configured to control a flow of pressurized hydraulic fluid between a source of pressurized fluid (for example, a charge pump drivetrain), the tank 134 (shown in FIGS. 1A and 1B) and the first and second actuating pistons 156-1, 156-2. In particular, to articulate the swashplate 138 from the positive position to the negative position, the three-way valve 162 may allow flow of pressurized fluid into the first chamber 158 to push the first actuating piston 156-1 toward the swashplate 138, so as to generate counterclockwise movement of the swashplate 138. Conversely, to articulate the swashplate 138 from the negative position to the position, the three-way valve 162 may allow flow of pressurized hydraulic fluid into the second chamber 160 to push the second actuating piston 156-2 toward the swashplate 138, so as to generate clockwise movement of the swashplate 138.

The three-way valve 162 may be actuated using a solenoid 172, shown in FIGS. 1A-1B. In one embodiment, the solenoid 172 may be disposed inside the three-way valve 162 and configured to control a valve element (not shown) located inside the three-way valve 162, which in turn controls flow of the pressurized fluid from the source of pressurized hydraulic fluid to either the first chamber 158 or the second chamber 160. In one embodiment, the solenoid 172 may be electro-hydraulically actuated, and thus may be controlled by an electrical signal provided by the controller 132 (see FIGS. 1A-1B).

Figure 3:
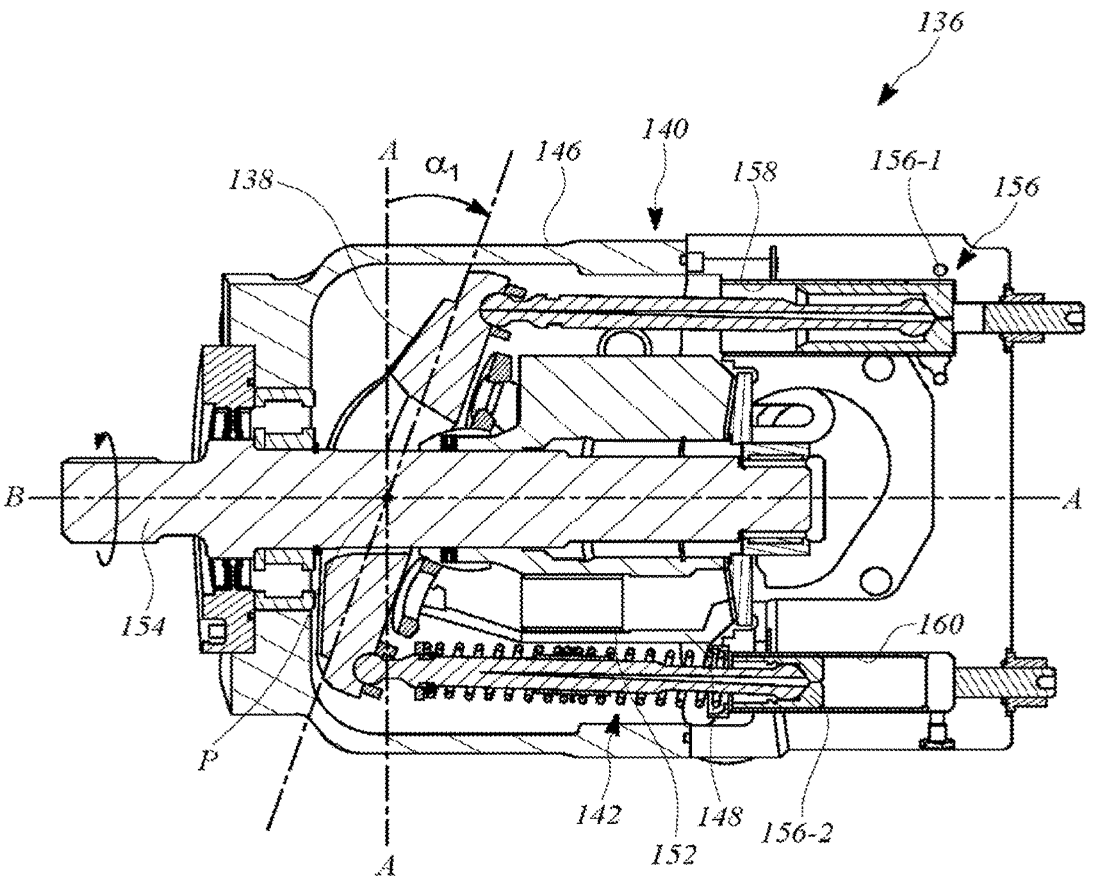
FIG. 3 is a sectional view of the open circuit variable displacement pump of FIG. 2 in the pump mode, according to one or more embodiments of the present disclosure.

FIG. 3 illustrates a sectional view of the variable displacement pump 136 of FIG. 2 in a pump mode. Specifically, in FIG. 3, the swashplate 138 is disposed in the positive position. In the illustrated embodiment, the swashplate 138 in the positive position can be disposed at a first swashplate angle $\alpha_1$ by rotating the swashplate 138 clockwise away from a line AA drawn perpendicularly from the barrel axis BA. In the pump mode, the first swashplate angle $\alpha_1$ may be varied based on operational requirements, such as discharge pressure and/or discharge flow rate.

In one embodiment, increasing the first swashplate angle $\alpha_1$ may cause increase in a stroke length of each piston of the pair of pistons 156, which may increase the amount of fluid that is pressurized to the predetermined level during each rotation of the barrel 148. Conversely, reducing the first swashplate angle $\alpha_1$ may cause reduction in stroke length of each piston of the pair pistons 158, which may decrease the amount of fluid that is pressurized to the predetermined level during each rotation of the barrel 148. In one embodiment, in the pump mode, the first swashplate angle $\alpha_1$ may vary within an inclination range varying from 0 degree with respect to the line AA to about 20 degrees with respect to the line AA.

Referring now to FIGS. 1A and 3, when the hydraulic fluid is not in circulation and/or when the hydraulic tool 102 is static, such as during start of the hydraulic tool 102, the open circuit variable displacement pump 136 is generally desired to be actuated to the pump mode. Thus, to maintain the swashplate 138 in the positive position or the open circuit variable displacement pump 136 in the pump mode, the energy recovery system 100 includes the bias system 142 (shown in FIG. 3), which will be described in detail with reference to FIGS. 6 and 7.

Figure 4:
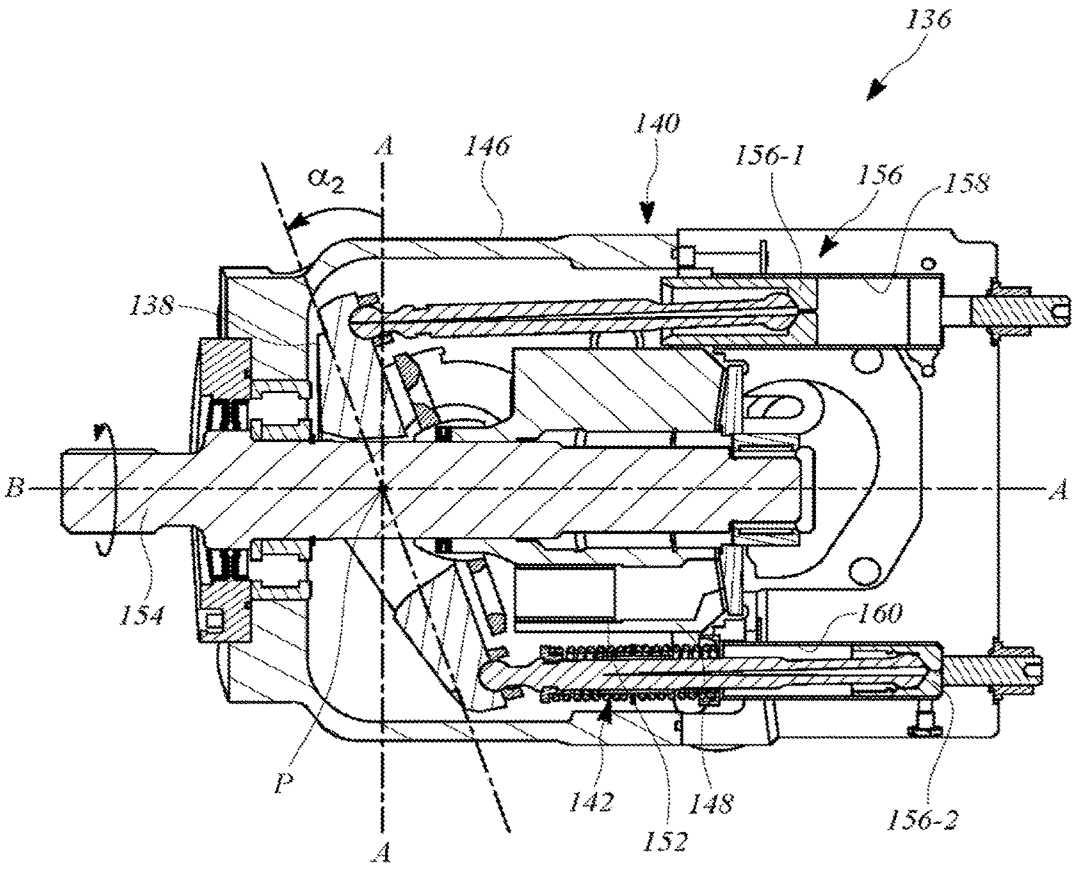
FIG. 4 is a sectional view of the open circuit variable displacement pump of FIG. 2 in the motor mode, according to one or more embodiments of the present disclosure.

FIG. 4 illustrates a sectional view of the open circuit variable displacement pump 136 of FIG. 2 in a motor mode, according to one or more embodiments of the present disclosure. Specifically, in FIG. 4, the swashplate 138 is disposed in the negative position. In the illustrated embodiment, the swashplate 138 in the negative position may be disposed at a second swashplate angle $\alpha_2$ by rotating the swashplate 138 counterclockwise away from the line 'AA.' In the motor mode, the second swashplate angle $\alpha_2$ may be varied based on operational requirements of the hydraulic tool 102. In some embodiments, in the motor mode, the second swashplate angle $\alpha_2$ may vary within an inclination range from 0 degree with respect to the line AA to about −20 degrees with respect to the line 'AA.

Referring now to FIGS. 1B and 4, when the hydraulic tool is performing the lowering motion, the hydraulic fluid from the first fluid line 120 flows into the first and second chambers 158, 160 of the barrel 148. Due to the flow of the hydraulic fluid through the first and second chambers 158, 160 of the barrel 148, the barrel 148 may rotate to cause corresponding rotation of the shaft 154. Additionally, due to the oscillatory motion of the pair of pistons 152, the hydraulic fluid may be pressurized and transferred to the tank 134. Accordingly, the open circuit variable displacement pump 136 may recover and/or utilize the energy contained within the hydraulic fluid to generate a mechanical energy output that is transferred to the engine 130 and the tank 134.

Figure 5:
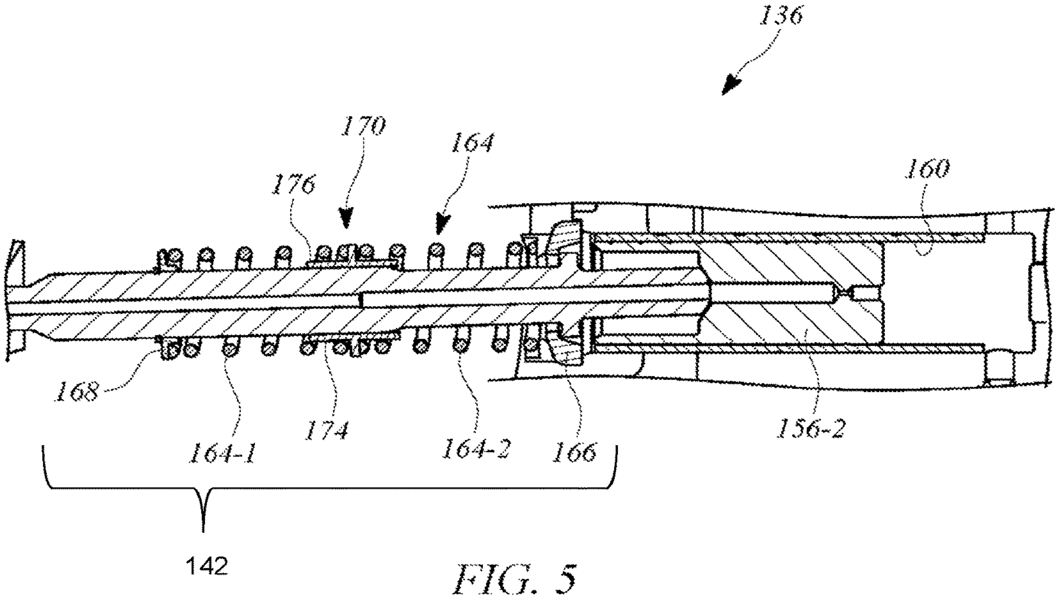
FIG. 5 is a sectional view of a portion of the open circuit variable displacement pump showing a bias system, according to one or more embodiments of the present disclosure.
Figure 6:
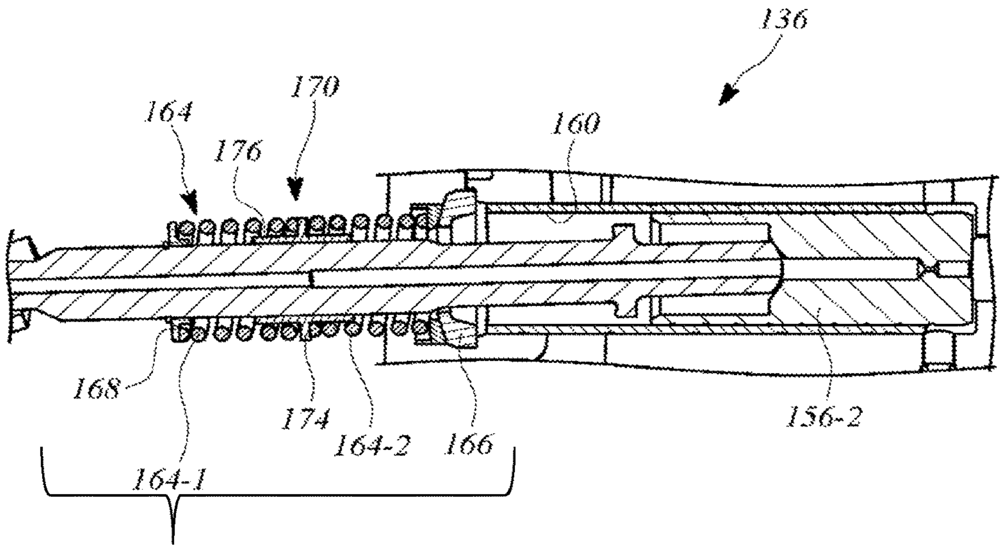
FIG. 6 is a sectional view of a portion of the variable displacement showing the bias system with a pair of springs separated by a slider, according to one or more embodiments of the present disclosure.

FIGS. 5-6 illustrate sectional views of a portion of the open circuit variable displacement pump 136 showing the bias system 142 to maintain the hydraulic tool 102 in the pump mode. The bias system 142 includes a plurality of springs 164 placed around one piston of the pair of actuating pistons 156 to provide a bias force on the piston and the swashplate 138. In the illustrated embodiment, the plurality of springs 164 can include two consecutive springs, individually referred to as a first spring 164-1 and a second spring 164-2. In one embodiment, the first spring 164-1 and the second spring 164-2 may be substantially identical springs and separated from each other. In such an embodiment, the first spring 164-1 and the second spring 164-2 may have similar elongations, extensions, and diameters. Each spring of the first spring 164-1 and the second spring 164-2 may have a spring wire diameter between 2.0 mm and 5.0 mm and preferably between 3.0 mm and 4.0 mm. Each spring of the first spring 164-1 and the second spring 164-2 may also have an outer diameter between 10.0 mm and 40.0 mm and preferably between 15.0 mm and 25.0 mm.

The first spring 164-1 and the second spring 164-2 may be placed around the second actuating piston 156-2 to provide bias force on the second actuating piston 156-2 and the swashplate 138. In one embodiment, to bias the swashplate 138 into the positive position, the first spring 164-1 and the second spring 164-2 may extend between a seat 166 affixed to the variable displacement pump 136 and a stop 168 affixed to the second actuating piston 156-2. Specifically, when the hydraulic fluid is not in circulation through the first and second chambers 158,160, the first spring 164-1 and the second spring 164-2 apply biasing force against the seat 166 affixed to the variable displacement pump 136 to create movement of the swashplate 138, so as to rotate the swashplate 138 in the clockwise direction.

Referring now to FIGS. 4 and 6, when the actuator 140 rotates the swashplate 138 to the negative position, the swashplate 138 applies force against biasing force of the first spring 164-1 and the second spring 164-2. In one embodiment, to prevent buckling due to such force, the first spring 164-1 and the second spring 164-2 may be separated by a slider 170. The slider 170 may be slidably affixed to the second actuating piston 156-2 to prevent buckling when the first spring 164-1 and the second spring 164-2, as shown in FIG. 6, are in compressed state. The slider 170 may include a base portion 174 and a flange portion 176 extending from the base portion 174. The base portion 174 may be adapted to receive the second actuating piston 156-2 therethrough. Further, the flange portion 176 may be adapted to hold the first spring 164-1 and the second spring 164-2. In one embodiment, the slider 170 may have an outside diameter between 10.0 mm and 30.0 mm and preferably between 15.0 mm and 25.0 mm.

The bias system 142 is illustrated with two substantially identical springs, e.g., the first spring 164-1 and the second spring 164-2, separated by a unique slider, e.g., the slider 170. Alternatively the bias system 142 may have more than two springs non-identical to each other, e.g., different outer diameters and/or lengths, being separated by more than two sliders non necessarily identical to each other.

Figure 7:
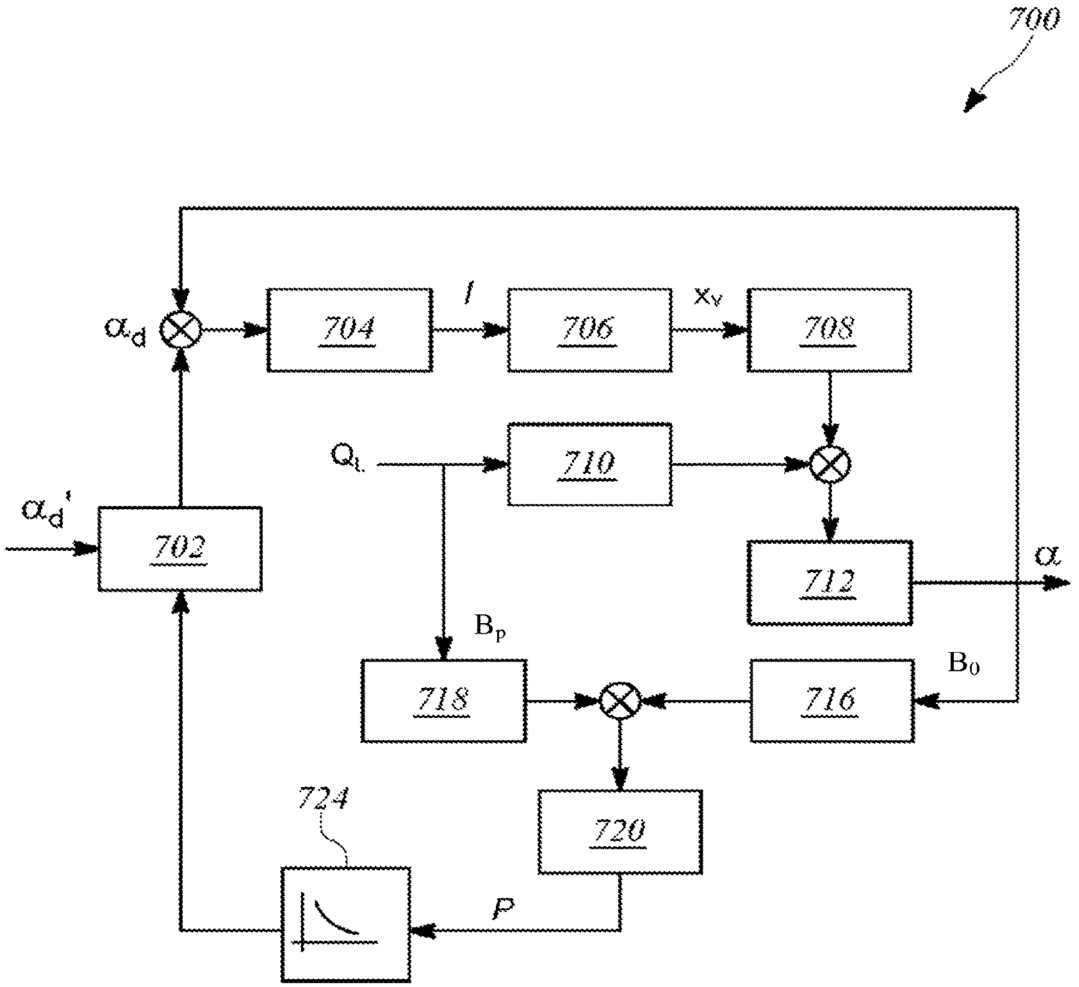
FIG. 7 is a schematic view of a control system for the energy recovery system, according to one or more embodiments of the present disclosure.

FIG. 7 is a schematic diagram of a control system 700 for the energy recovery system 100, according to one or more embodiments of the present disclosure.

Referring to FIGS. 1A, 1B and 7, the control system 700, which may be referred to as a closed loop system, can be adapted to control the energy recovery system 100. Specifically, the control system 700 can be adapted to articulate the swashplate 138 between the positive position and the negative position to operate the energy recovery system 100 in one of the pump mode and motor mode. In one embodiment, the control system 700 can control outputs, i.e., the swashplate angle $\alpha$ and/or pressure P, based on control inputs, i.e., operator command $\alpha'$, position of valve element in the three way valve $X_v$, load flow rate of the variable displacement pump $Q_L$, torque limiter curve, and/or pump geometry constants, such as $B_p$ and $B_0$.

Referring to FIG. 7, at control block 702, the signals corresponding to operator commands to control the hydraulic tool 102 can be received. The signals received at the control block 702 may correspond to operator commands to move the hydraulic tool 102 in the prescribed motion. In one embodiment, the signals corresponding to operator commands, e.g., $\alpha_d'$, to control the hydraulic tool 102 may be received from the operator through the control interface 126, as described earlier. Corresponding to the operator commands, a desired swashplate angle $\alpha_d$ may be determined based on the torque limiter curve from the control block 702, and further a historic discharge pressure of the variable discharge pressure.

At control block 704, the controller 132 may be configured to receive the desired swashplate angle $\alpha_d$ calculated after comparison with the upper torque limit and the lower torque limit. Based on the desired swashplate $\alpha_d$, the controller 132 may be configured to determine an amperage current I required for actuating the solenoid 172 of the actuator 140.

At control block 706, a value corresponding to the position of valve element in the three way valve $X_v$ may be determined based on the amperage current I. Further, in control block 708, a value corresponding to the flow gain function may be determined based on the position of valve element in the three way valve $X_v$. In one embodiment, the flow gain function may be understood as an amount of pressurized fluid that enters the first chamber 158 corresponding to the position of valve element in the three way valve $X_v$.

At control block 710, a value corresponding to load flow transfer function can be determined based on the load flow rate of the variable displacement pump $Q_L$. Further, in one embodiment, at control block 712, a value of the swashplate angle $\alpha$ can be determined based on the flow gain function and the load flow transfer function. In one embodiment, the swashplate angle $\alpha$ may be determined based on singular perturbed pump model. Based on the swashplate angle $\alpha$, the swashplate 138 may be articulated either in the positive position or in the negative position.

At control block 718, load flow rate of the variable displacement pump $Q_L$ may be adjusted based on a first pump geometry constant, Bp. Further, in control block 716, the desired swashplate angle $\alpha_d$ may be adjusted based on a second pump geometry constant, B0. In control block 718, a value of the discharge pressure, e.g., P, can be modeled based on the load flow rate of the variable displacement pump $Q_L$, desired torque $\alpha_d$, and/or the pump geometry constants, $B_p$ and $B_0$. Preferably, P can be measured using a pressure transducer. The discharge pressure, P, may be utilized to determine the desired swashplate angle $\alpha_d$, based on the torque limiter in a subsequent iteration.

Figure 8:
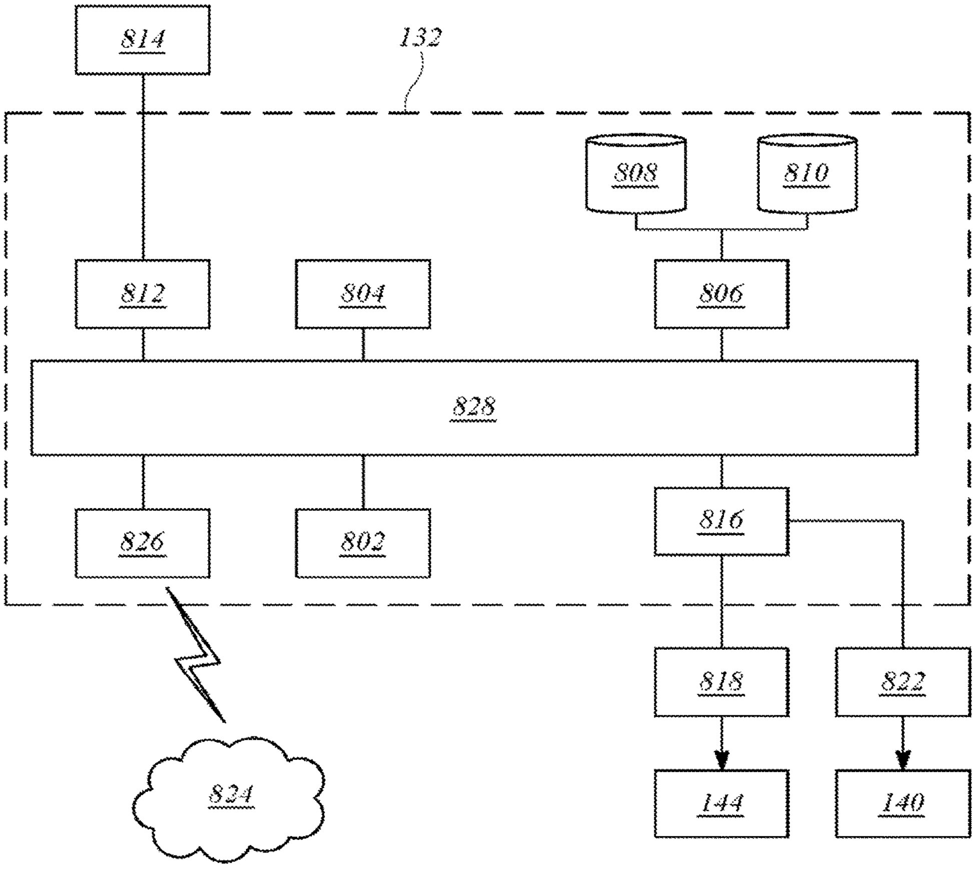
FIG. 8 is a schematic view of a controller of the energy recovery system, according to one or more embodiments of the present disclosure.

FIG. 8 illustrates a schematic view of the controller 132 of the energy recovery system 100, according to one or more embodiments of the present disclosure.

As shown in FIG. 8, systems, operations, and processes in accordance with this disclosure may be implemented using a processor 802 or at least one application specific processor (ASP). The processor 802 may utilize a computer readable storage medium, such as a memory 804 (e.g., ROM, EPROM, EEPROM, flash memory, static memory, DRAM, SDRAM, and their equivalents), configured to control a processor 802 to perform and/or control the systems, operations, and processes of this disclosure. Other storage media may be controlled via a disk controller 806, which may control a hard disk drive 808 or an optical disk drive 810.

The processor 802 or aspects thereof, in an alternate embodiment, can include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor 802 may be a separate device or a single processing mechanism. Further, this disclosure may benefit form parallel processing capabilities of a multi-cored processor.

The controller 800 can include a display controller 812 that controls a monitor 814. The monitor 814 may be peripheral to or part of the controller 132. The display controller 812 may also include at least one graphic processing unit for improved computational efficiency.

Additionally, the controller 132 may include an I/O (input/output) interface 816, provided to allow entering sensor data from the plurality of sensors 818, e.g., the pressure sensor 144, and to generate output orders to actuators 822, e.g., the actuator 140.

The above-noted hardware components may be coupled to a network 824, such as the internet or a local intranet, via a network interface 826 for the transmission or reception of data, including controllable parameters to a mobile device. A central BUS 828 may be provided to connect the above-noted hardware components together, and to provide at least one path for digital communication therebetween.

INDUSTRIAL APPLICABILITY

Embodiments of the present disclosure can have applicability in the hydraulic tool 102, such as an excavator, to selectively provide potential energy and recover potential energy based on a prescribed motion of the hydraulic tool 102. For example, the hydraulic circuit 128 of the energy recovery system 100 may articulate the hydraulic tool 102 in the pump mode to provide the potential energy during lifting motion of the work implement 110, and in the motor mode to recover energy from the potential energy during lowering motion of the work implement 110. In particular, the open circuit variable displacement pump 136 may be selectively articulated in the pump mode to circulate the hydraulic fluid from the tank 134 to the cylinders 112 during lifting motion of the work implement 110, and in the motor mode to recover energy associated with the pressurized hydraulic fluid discharged from the cylinders 112 during lowering motion of the work implement 110.

Figure 9:
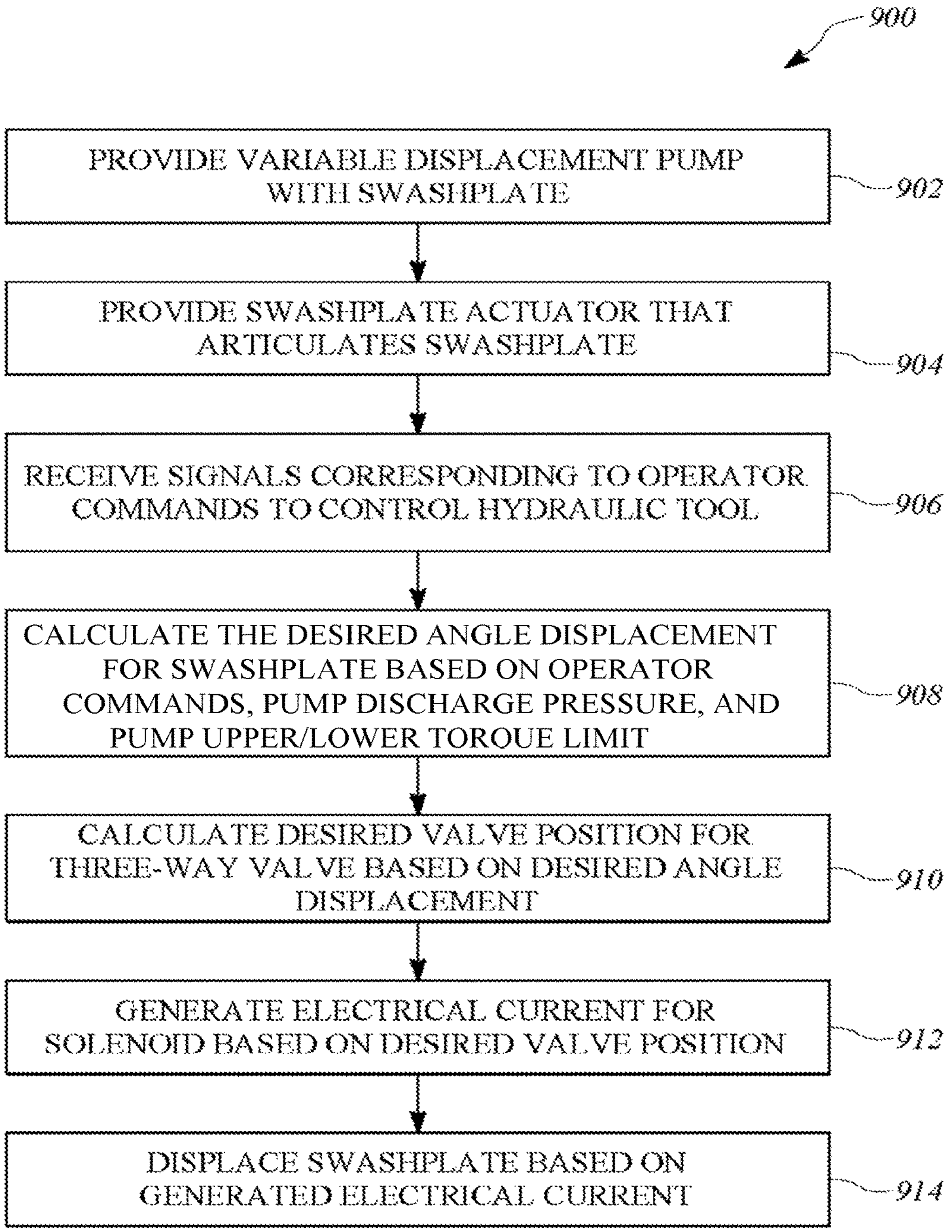
FIG. 9 is a flow chart of a method of operating the energy recovery system for the hydraulic tool, according to one or more embodiments of the present disclosure.

A method of operating the energy recovery system 100 in accordance with one or more embodiments of the present disclosure is illustrated in FIG. 9. For the sake of brevity, the aspects of the present disclosure which have already been explained in detail in the description of FIGS. 1A-8 are not explained in detail with regard to the description of the method 900 of FIG. 9.

Referring to FIG. 9, at step 902, the method 900 can include providing an open circuit variable displacement pump, such as the open circuit variable displacement pump 136, with the swashplate 138. The swashplate 138 may be articulable between the positive position and the negative position so as to articulate the hydraulic tool 102 in the pump mode and the motor mode.

At step 904, the method 900 can include providing the actuator 140 that articulates the swashplate 138 between the positive position and the negative position. The actuator 140 may include the three-way valve 162 actuated by a solenoid 172 based on control signals from the controller 132, for instance.

At step 906, the method 900 can include receiving, at the controller 132, for instance, signals corresponding to operator commands to control the hydraulic tool 102. In one embodiment, the control interface 126 may be configured to receive the signals corresponding to the prescribed motion for the hydraulic tool 102. In one embodiment, the method 900 may also include verifying that the operator commands do not correspond to a desired torque higher than an upper torque limit or lower than a lower torque limit. In addition, at step 906, the method 900 may include determining, using the controller 132, for instance, a desired angle, e.g., corresponding to the pump discharge pressure and the torque limit.

At step 908, the method 900 can include determining, using the controller 132, for instance, the desired valve position $X_v$ for the three-way valve 162 based on the desired angle displacement.

At step 910, the method 900 can include generating electrical current for the solenoid 172, e.g., the amperage current I, based on the desired valve position.

At step 912, the method 900 can include displacing the swashplate 138, via the actuator 140, based on the generated electrical current.

The energy recovery system 100 and the method 900 can offer an effective technique in recovering potential energy during operation of the hydraulic tool 102, such as during lowering motion of the work implement system 104. Such technique may help in avoiding or reducing potential energy to be diffused through heat and thus, prevent or reduce overheating of various components of the hydraulic tool 102. As such, the energy recovery system 100 and the method 900 can reduce wastage of the potential energy. In this regard, the controller 132 of the energy recovery system 100 can determine the swashplate angle based on a number of parameters, such as the operator command, the upper torque limit and/or the lower torque limit. Such determination can assist in real time articulation of the hydraulic tool 102 from the pump mode to the motor mode. Moreover, since the energy recovery system 100 of the present disclosure can utilize a single solenoid driven three-way valve 162 to articulate the hydraulic tool 102 from the pump mode to the motor mode, the present disclosure can provide an efficient and effective technique to reliably articulate the hydraulic tool 102 from the pump mode to the motor mode.

In addition, the energy recovery system 100 can include the bias system 142 which can include or involve the plurality of springs 164 to articulate the hydraulic tool 102 from the motor mode to the pump mode when the hydraulic fluid is not circulating through the hydraulic circuit 128. The plurality of springs 164 can maintain or assist in maintaining the hydraulic tool 102 in the pump mode when the hydraulic fluid is not in circulation. In some embodiments, the plurality of springs 164 may be separated by the slider 170, for instance, to prevent or lessen buckling, which may help in the reliable articulation of the hydraulic tool 102 from the motor mode to the pump mode in a wide range of applications, for instance, where displacement of the swashplate 138 can change from time to time.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An energy recovery system for a hydraulic tool comprising:

a control interface configured to receive inputs corresponding to a prescribed motion for the hydraulic tool;

a hydraulic circuit configured to articulate the hydraulic tool based on the prescribed motion in a pump mode to provide potential energy, and in a motor mode to recover energy from the potential energy, the hydraulic circuit including:

cylinders configured to receive and release a hydraulic fluid;

a tank configured to store the hydraulic fluid; and an open circuit variable displacement pump configured to circulate the hydraulic fluid from the tank to the cylinders in the pump mode and circulate the hydraulic fluid from the cylinders to the tank in the motor mode, the open circuit variable displacement pump including:

a swashplate articulable between a positive position and a negative position, wherein in the positive position the hydraulic fluid circulates in the pump mode and in the negative position the hydraulic fluid circulates in the motor mode, an actuator configured to articulate the swashplate; and a bias system configured to maintain the swashplate in a positive position when the hydraulic fluid is not in circulation; and an engine configured to provide energy to the open circuit variable displacement pump in the pump mode and receive energy from the open circuit variable displacement pump in the motor mode.

2. The energy recovery system of claim 1, wherein the actuator includes a pair of pistons to rotate the swashplate between the positive position and the negative position.

3. The energy recovery system of claim 2, wherein the actuator further includes a three-way valve to actuate the pair of pistons.

4. The energy recovery system of claim 3, wherein the actuator further includes a solenoid to actuate the three-way valve.

5. The energy recovery system of claim 2, wherein the bias system includes a plurality of springs placed around one piston of the pair of pistons to provide a bias force on the piston and the swashplate.

6. The energy recovery system of claim 5, wherein the plurality of springs extends between a seat affixed to the open circuit variable displacement pump and a stop affixed to the piston.

7. The energy recovery system of claim 5, wherein two consecutive springs of the plurality of springs are separated by a slider slidably affixed to the piston to prevent buckling.

8. The energy recovery system of claim 7, wherein the two consecutive springs are substantially identical springs separated.

9. The energy recovery system of claim 1, wherein the tank includes an accumulator to maintain the hydraulic fluid under pressure and store energy recovered in the motor mode.

10. An energy recovery system for a hydraulic tool comprising:

cylinders configured to articulate the hydraulic tool in a pump mode to provide potential energy and in a motor mode to recover the potential energy;

a tank configured to store a hydraulic fluid for the cylinders; and an open circuit variable displacement pump configured to circulate the hydraulic fluid in the pump mode from the tank to the cylinders and in the motor mode from the cylinders to the tank, the open circuit variable displacement pump including:

a swashplate articulable between a positive position and a negative position, wherein in the positive position the hydraulic fluid circulates in the pump mode and in the negative position the hydraulic fluid circulates in the motor mode, an actuator configured to articulate the swashplate; and a bias system configured to maintain the swashplate in a positive position when the hydraulic fluid is not in circulation.

11. The energy recovery system of claim 10, wherein the actuator includes a pair of pistons to rotate the swashplate between the positive position and the negative position.

12. The energy recovery system of claim 11, wherein the actuator further includes a three-way valve to actuate the pair of pistons.

13. The energy recovery system of claim 12, wherein the actuator further includes a solenoid to actuate the three-way valve.

14. The energy recovery system of claim 11, wherein the bias system includes a plurality of springs placed around one piston of the pair of pistons to provide a bias force on the piston and the swashplate.

15. The energy recovery system of claim 14, wherein the plurality of springs extends between a seat affixed to the open circuit variable displacement pump and a stop affixed to the piston.

16. The energy recovery system of claim 14, wherein two consecutive springs of the plurality of springs are separated by a slider slidably affixed to the piston to prevent buckling.

17. The energy recovery system of claim 16, wherein the two consecutive springs are substantially identical springs separated.

18. The energy recovery system of claim 10, wherein the tank includes an accumulator to maintain the hydraulic fluid under pressure and store energy recovered in the motor mode.

19. A method of operating an energy recovery system for a hydraulic tool, the method comprising:

providing an open circuit variable displacement pump with a swashplate;

providing a swashplate actuator that articulates the swashplate, the swashplate actuator having a three-way valve actuated by a solenoid;

receiving, at a controller, signals corresponding to operator commands to control the hydraulic tool;

calculating, using the controller, a desired angle displacement for the swashplate based on the operator commands, an upper torque limit, and a lower torque limit;

calculating, using the controller, a desired valve position for the three-way valve based on the desired angle displacement;

generating electrical current for the solenoid based on the desired valve position; and displacing the swashplate, via the swashplate actuator, based on the generated electrical current.

20. The method of claim 19, further comprising verifying that the operator commands do not correspond to a desired torque higher than the upper torque limit or lower than the lower torque limit.

* * * * *